June 17, 1930.  J. W. LEGG  1,764,410
CONTROL OF ELECTRICAL INSTRUMENTS
Filed June 23, 1925    2 Sheets-Sheet 1
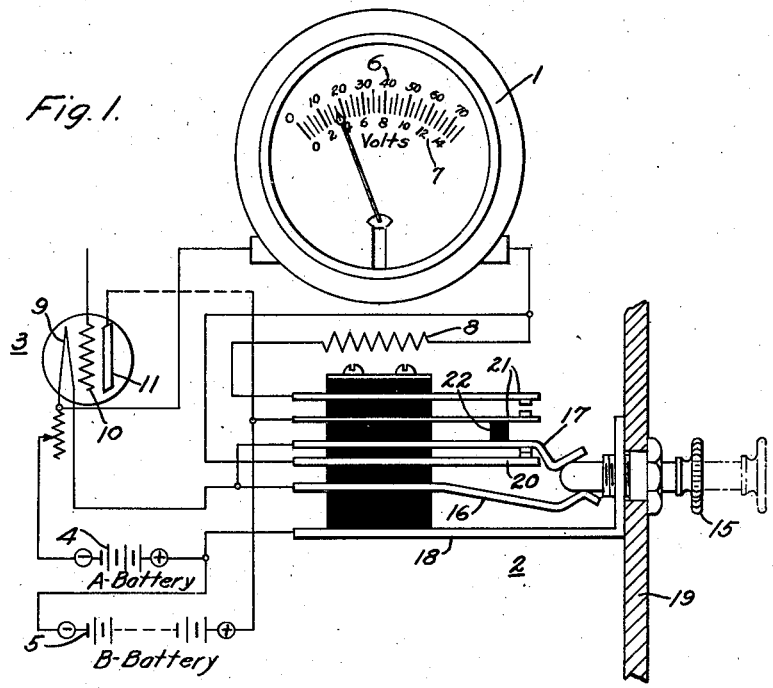
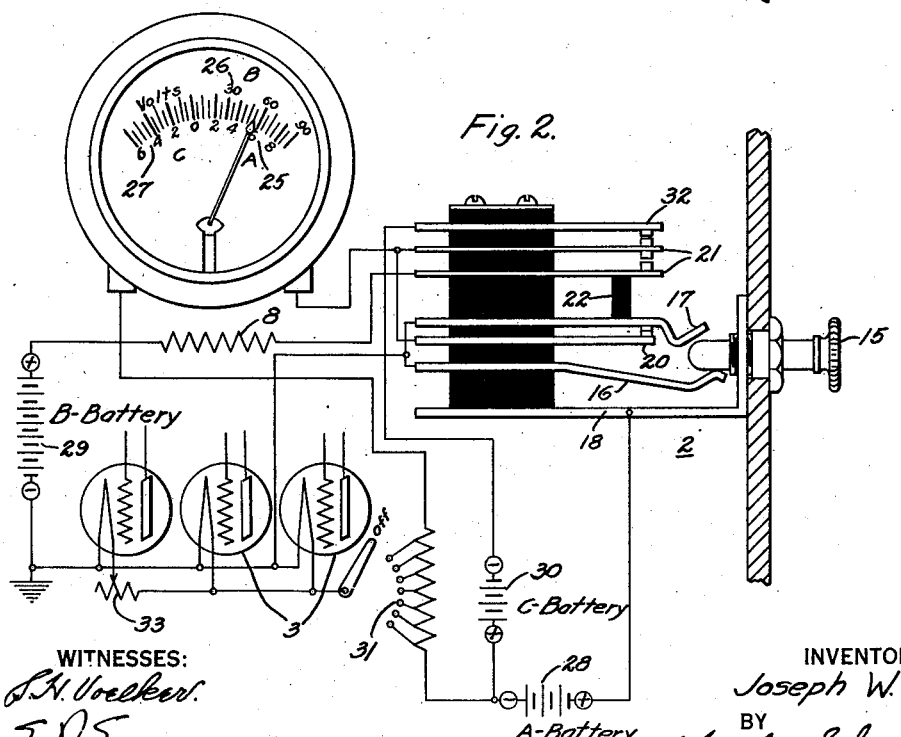
WITNESSES:
J. H. Voelker
T. R. Evans
INVENTOR
Joseph W. Legg.
BY
Eberley S. Barr
ATTORNEY June 17, 1930.  J. W. LEGG  1,764,410
CONTROL OF ELECTRICAL INSTRUMENTS
Filed June 23, 1925  2 Sheets-Sheet 2
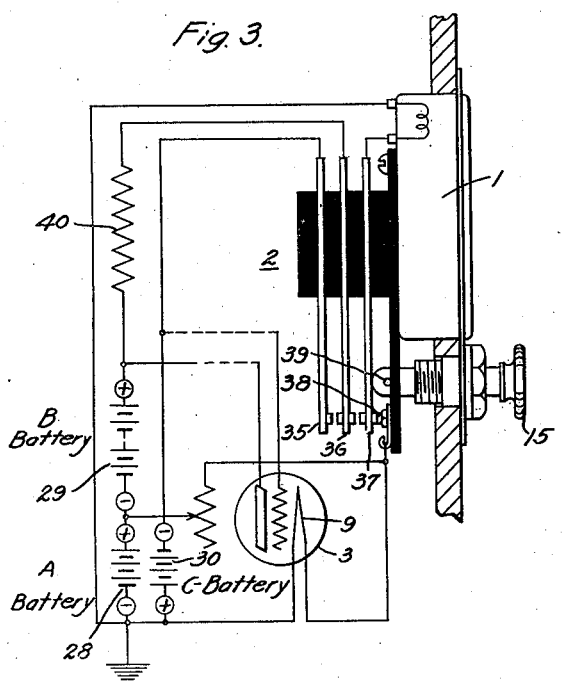
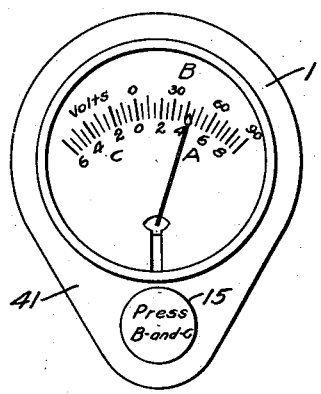
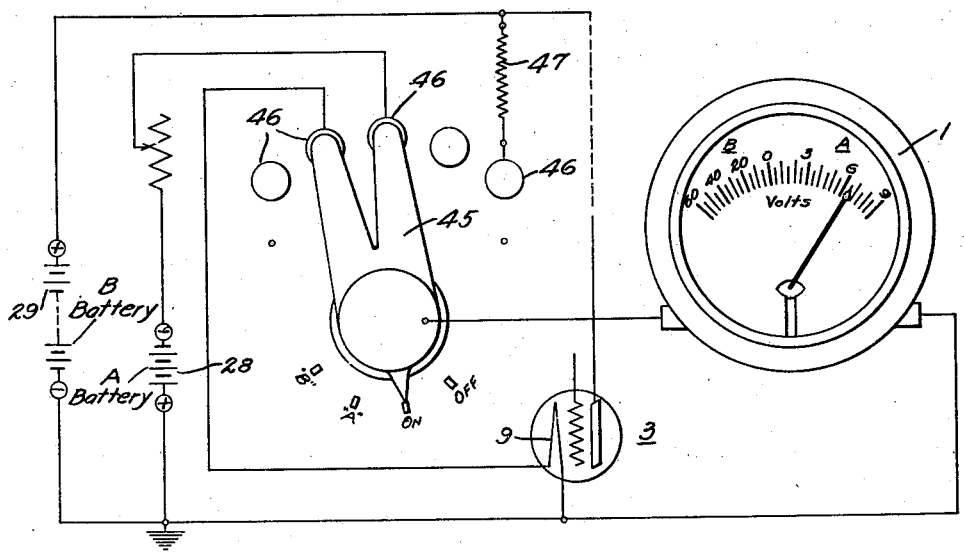
WITNESSES:
INVENTOR
Joseph W. Legg.
BY
ATTORNEY Patented June 17, 1930

1,764,410

UNITED STATES PATENT OFFICE

JOSEPH W. LEGG, OF WILKINSBURG, PENNSYLVANIA, ASSIGNOR TO WESTINGHOUSE ELECTRIC & MANUFACTURING COMPANY, A CORPORATION OF PENNSYLVANIA

CONTROL OF ELECTRICAL INSTRUMENTS

Application filed June 23, 1925. Serial No. 38,996.

My invention relates to electrical apparatus employing measuring instruments, particularly of the multi-range type.

One object of my invention is to provide improved control and instrument circuits for a thermionic amplifier or similar device suitable for use in an electro-cardiograph.

Another object of my invention is to provide a thermionic amplifier having a switch controlling the circuit thereof, with a measuring instrument cooperating with said amplifier and controlled by said switch.

A further object of my invention is to provide a thermionic amplifier having a plurality of sources of current, with a multi-range measuring instrument and a switch adapted to control said amplifier and connect said measuring instrument to said sources of current.

Thermionic amplifiers used in electro-cardiographs and other apparatus require a plurality of sources of current of different potentials. The three-electrode thermionic tube, for example, requires "A", "B" and, in some cases "C" batteries connected in the cathode and anode circuits thereof, respectively. The cathode heating potential may be six volts and this value cannot be varied to any considerable extent from the normal value. If the cathode potential derived from the "A" battery is too low, the tube will not function whereas, if it is too high, the cathode will be destroyed or injured. Likewise, if the values of the "B" and "C" battery potentials decrease below the normal values, by reason of the deterioration of the batteries, the tube will not function. The "B" and "C" battery potentials may be ninety volts and four and one-half volts, respectively.

In accordance with my invention, a multi-range measuring instrument, such as a voltmeter, is employed in connection with a thermionic amplifier and a switch which is adapted to connect the instrument to the sources of current for operating the amplifier. By reason of the diversity of the voltages of said sources, multipliers or shunts are connected through said switch between the instrument and the respective sources of current.

The switch is adapted to control the circuit of the amplifier and, in its preferred form, comprises a manually-operable member having normal and depressed positions in which the measuring instrument is connected to the cathode and anode circuits of the amplifier, respectively. The switch may embody means tending to restore the manually-operable member from the depressed to the normal position to avoid discharging the high-voltage "B" battery through the instrument when the apparatus is operated by unskilled persons.

Other detailed objects and advantages of my invention will appear from the following description of the embodiments thereof shown on the accompanying drawings.

In the drawings, Fig. 1 is a diagrammatic view of an instrument control circuit arranged in accordance with my invention;

Figs. 2 and 3 are similar views of two modified forms of the invention;

Fig. 4 is a front view of the instrument shown in Fig. 3; and

Fig. 5 is a diagrammatic view of another modification of my invention.

Referring to Fig. 1, a multi-range voltmeter 1 is controlled by a switch 2 that also serves to control a thermionic tube 3. The thermionic tube 3 may be the amplifier of an electro-cardiograph or other apparatus. The apparatus associated with the tube may be designed to indicate the characteristics of tubes, such as is employed by dealers in such tubes. A plurality of batteries 4 and 5 are provided for energizing the thermionic tube 3.

The instrument 1 comprises a plurality of scales 6 and 7 of different magnitudes, a multiplier 8 being connected in series with the terminals of the instrument for use on high-voltage circuits. In the arrangement shown, the low-range scale 7 is calibrated for the direct connection of the voltmeter to a source of potential and the high-range scale 6 is calibrated for the connection of the instrument in series with the multiplier 8.

The thermionic tube 3 comprises a cathode 9 and anodes 10 and 11 of the usual character. The construction of the thermionic tube forms no part of the present invention which, though especially adapted for use in conjunction with thermionic tubes may be employed with other apparatus requiring a plurality of sources of potential. The battery 4 is connected to the cathode 9 of the thermionic tube and is commonly referred to as the "A" battery. The battery 5, of relatively high voltage, for example, 45 or 50 volts, is connected in series with the anode circuit including the cathode 9 and the anode 11, and is commonly referred to as the "B" battery.

The control switch 2 comprises a removable key or operating member 15 cooperating with contact springs 16 and 17 that are supported by a bracket 18. The bracket 18 may be secured to a panel 19, as indicated, in order to arrange the contact elements of the switch inside of the casing containing the thermionic amplifier. The switch also comprises a contact member 20 normally engaging the contact member 17 and two resilient contact members 21 that are normally out of engagement but are adapted to be moved into engagement by the movement of the contact member 17 when actuated by the operating member 15. The contact member 17 is adapted to actuate the contact members 21 through the insulating member 22.

When the operating member 15 of the switch is removed, the circuits of the measuring instrument 1 and the thermionic tube 3 are open. When the operating member 15 is inserted in the normal position as shown, a circuit is closed from the positive terminal of the "A" battery 4 through the bracket 18, the plug or switch member 15 and contact member 16 for energizing cathode 9 of the thermionic tube. A circuit is also closed from the "A" battery 4 through the bracket 18, switch member 15, contact members 17 and 20 and instrument 1 to the negative terminal of the cathode 9. The instrument, therefore, indicates the cathode heating potential.

The "B" battery potential is obtained by depressing the switch member 15, thereby opening the circuit between the contact members 17 and 20 and closing the circuit including the contact members 21. The closure of the circuit including the contact members 21 connects the instrument in series with the multiplier 8 to the "A" batteries in series. Consequently, an indication is given of the potential applied to the anode circuit.

In the case of an amplifier operated by a person who is not skilled in the theory of the apparatus, a common source of trouble is the deterioration of the batteries. The thermionic tube employed in such apparatus fails to function if either the "A" or "B" battery potentials are too low. Furthermore, the cathode heating potential may not be increased above a predetermined value or the cathode 9 is injured or destroyed. It is necessary to provide a control switch for switching the amplifier into circuit when it is desired to use the apparatus and by the use of the switch which I have described, the measuring instrument may be operated by the same switch to provide an indication of both anode and cathode potentials.

There is no possibility of injuring the measuring instruments, although the "B" battery potential is relatively high, and the resiliency of the contact member 17 restores the switch member 15 to the normal position when it is released. Accordingly, the "B" battery cannot be accidentally left connected to the instrument, which is an important feature, inasmuch as "B" batteries of the dry-battery type are usually of small capacity and would be injured in a short time if left connected to a voltmeter.

In Fig. 2 is shown a modification of my invention in which certain additional functions are provided. The multi-range voltmeter 1 comprises three voltage scales 25, 26 and 27, and the thermionic tubes 3 are provided with "A", "B" and "C" batteries 28, 29 and 30, respectively, connected to the cathode and the two anode circuits thereof respectively. A variable resistor 31 having an "off" or open position is connected in series with the cathodes of the thermionic tubes 3. The controlling switch 2 is similar to that shown in Fig. 1 but comprises an additional contact member 32.

When the operating member 15 of the switch is removed, the circuits of the thermionic tubes 3 are opened irrespective of the position of the variable resistor 31. If the switch member 15 is inserted and the resistor 31 is in the "off" position, a circuit is closed from the positive terminal of the "A" battery through the bracket 18, switch member 15, contact members 16, 17 and 20, the measuring instrument 1 and resistor 31 to the negative terminal of the "A" battery. Accordingly, the instrument 1 indicates the voltage of the "A" battery, and if the "A" battery is a storage battery, may be used to indicate the charging voltage when the battery is being charged. The thermionic tubes 3 are disconnected from the circuit during this period. The current required for the voltmeter 1 is so small that the potential drop in the resistor 31 is negligible and the error resulting from the inclusion of this resistor in the circuit is not appreciable.

If the variable resistor 31 is moved from the "off" position, the thermionic tubes 3 are connected in circuit and the instrument 1 indicates the potential applied to the cathodes of the tubes which do not contain a series resistor, such as indicated at 33. It is desirable, of course, to measure the highest potential applied to any of the several tubes.

If the switch member 15 is slightly depressed until engagement is effected between the contact members 21, a circuit is closed from the positive terminal of the "B" battery through the multiplier 8, contact members 21, instrument 1, resistor 31, "A" battery 28, bracket 18 and contact member 16 to the negative terminal of the "B" battery. The instrument 1, therefore, indicates the sum of the potentials of the "A" and "B" batteries and the deflection is in the same direction as in the first instance. The scale 26 is therefore calibrated for use with the multiplier 8. If the switch operating member 15 is further depressed until contact is made between the contact members 21 and 32, the negative terminal of the "C" battery 30 is connected through the contact members 32 and 21 to the instrument 1. On account of the high resistance of the multiplier 8, the instrument indicates the "C" battery potential, which is of the order of four or five volts, although the "B" battery is not disconnected, and the deflection of the instrument is in the reverse direction, thereby clearly distinguishing between the "B" and "C" battery indications.

When the switch member 15 is released, the resilient contact member 17 restores the same to the normal position shown. The switch shown in Fig. 2, therefore, provides an indication of the "A" battery potential, the maximum cathode potential and the "B" and "C" battery potentials when desired.

In Figs. 3 and 4, I have shown a further modification of my invention embodying the special control switch 2 comprising resilient contact members 35, 36 and 37. The contact members 35, 36 and 37 are normally out of engagement with each other and the contact member 37 normally engages a stationary contact member 38. The operating member 15 is of the non-removable type, being held in position by the pin 39 and a separate control switch being provided for the thermionic tube 3. A multiplier 40 is connected in series with the "B" battery 29. As shown in Fig. 4, the switch member 15 may be incorporated as a part of the voltmeter 1 and mounted on a front plate 41 of the instrument.

A circuit is normally closed from the terminals of the cathode 9 through the contact members 37 and 38 for indicating the voltage across the cathode. If the switch member 15 is depressed until contact between the contact members 37 and 38 is broken and contact members 36 and 37 are engaged a circuit is provided from the positive terminal of the "B" battery through the multiplier 40, contact members 36 and 37, measuring instrument 1 and "A" battery 28 to the negative terminal of the "B" battery. The instrument indicates the sum of the potentials of the "A" and "B" batteries therefor.

If the switch member 15 is further depressed until the contact members 35 and 36 are engaged, a circuit is closed from the negative terminal of the "C" battery through contact members 35, 36 and 37 and instrument 1 for indicating the "C" battery potential. I have shown and described this modification in order to emphasize the fact that the specific construction of the control switch is immaterial and that the control switches for the cathode circuit and for the instrument circuits may be independent of each other.

In Fig. 5 is shown a control switch comprising a pivoted contact member 45 adapted to cooperate with a plurality of stationary contact members 46. In the "off" position of the switch, the circuits of the cathode 9 of the thermionic tube 3 and the instrument 1 are open. If the control switch 45 is moved to the "on" position, the cathode 9 is energized and the instrument 1 is connected across the terminals thereof and indicates the cathode potential. In the "A" and "B" positions of the switch 45, the cathode circuit is broken and the instrument 1 is connected across the "A" and "B" batteries respectively, the multiplier 47 being connected in series with the "B" battery 29. Since the "A" and "B" batteries are reversed with respect to the instrument 1, the deflection of the instrument is in opposite directions and there is no possibility of confusing the two indications.

I am aware that many modifications of the apparatus described herein will occur to those skilled in the art and I desire therefore that only such limitations shall be imposed upon the scope of my invention as may be indicated in the appended claims.

I claim as my invention:

1. The combination with an electrical translating device and a plurality of sources of current therefor, of a measuring instrument having a plurality of ranges corresponding to the values of said sources and unitary switching means controlling the energization of said device from said sources and the connection of said sources to said instrument.

2. The combination with a thermionic tube having anode and cathode circuits and a source of current for each of said circuits, of a measuring instrument having a plurality of ranges corresponding to the values of said sources and a switch controlling said cathode circuit and the connection of said sources to said measuring instrument.

3. The combination with a thermionic tube having anode and cathode circuits and a source of current for each of said circuits, of a measuring instrument having a plurality of ranges and a switch controlling said cathode circuit and the connection of said instrument to said anode and cathode circuits.

4. The combination with a thermionic amplifier having anode and cathode circuits and a measuring instrument, of a switch comprising contact members and a manually operable member resiliently held in a normal position for controlling said cathode circuit, said manually operable member being arranged to connect the cathode and anode circuits respectively to said instrument in the normal and operated positions thereof.

5. The combination with a thermionic amplifier having anode and cathode circuits and a measuring instrument, of a switch comprising a removable key member and contact members controlled thereby to close the cathode circuit and to connect the instrument thereto upon the insertion of the key member and to connect the instrument to the anode circuit upon the further operation of said key member.

6. The combination with a thermionic amplifier having anode and cathode circuits and a measuring instrument, of a switch comprising contact members and a manually operable member for controlling said cathode and anode circuits, said switch being arranged to connect said measuring instrument to the anode circuit in one position and to the cathode circuit in the other position.

7. The combination with a thermionic tube having an anode circuit and a normally open cathode heating circuit, of a measuring instrument and a switch comprising contact members in the cathode circuit and contact members for electrical connection between both of said circuits and said instrument.

8. The combination with a thermionic tube having an anode circuit and a normally open cathode heating circuit, of a multi-range measuring instrument and a switch comprising a manually operable member, contact members in the cathode circuit and contact members for electrical connection between both of said circuits and said instrument controlled by said manually operable member and means for biasing said manually operable member away from the position in which the instrument is connected to the anode circuit.

9. The combination with a thermionic tube having a cathode heating circuit and an anode circuit, of a variable resistor having an open-circuit position in said cathode heating circuit, a multi-range measuring instrument having one terminal thereof connected to one end of said resistor, a switch having contact members in the cathode heating circuit and other contact members between the other terminal of the measuring instrument and the cathode and anode circuits and a multiplier between said instrument and the anode circuit of the tube.

10. The combination with a plurality of current sources, of an indicating instrument, and unitary switch mechanism comprising an operating member for successively relating said current sources to said instrument, said switch mechanism including a resilient member for biasing said operating member away from one of its related positions.

11. The combination with a plurality of current sources, of an indicating instrument, and unitary switch mechanism comprising a reciprocatory operating member for successively relating said current source to said instrument, said switch mechanism including means for biasing said operating member away from one of its related positions.

12. The combination with a thermionic tube having anode and cathode circuits, a first source of current for said anode circuit, and a second source of current for said cathode circuit and of lower potential than said first source, of an indicating instrument comprising a plurality of ranges corresponding with the potentials of said current sources, and switch mechanism comprising an operating member for first relating the instrument mechanism of one of said ranges with said second source of current and for thereafter relating the instrument mechanism of another of said ranges with said first source of current while continuing the relation first effected.

In testimony whereof, I have hereunto subscribed my name this 11th day of June, 1925.

JOSEPH W. LEGG.